(No Model.)
J. L. RICHTER.
GAS REGULATOR.
No. 545,725.  Patented Sept. 3, 1895.
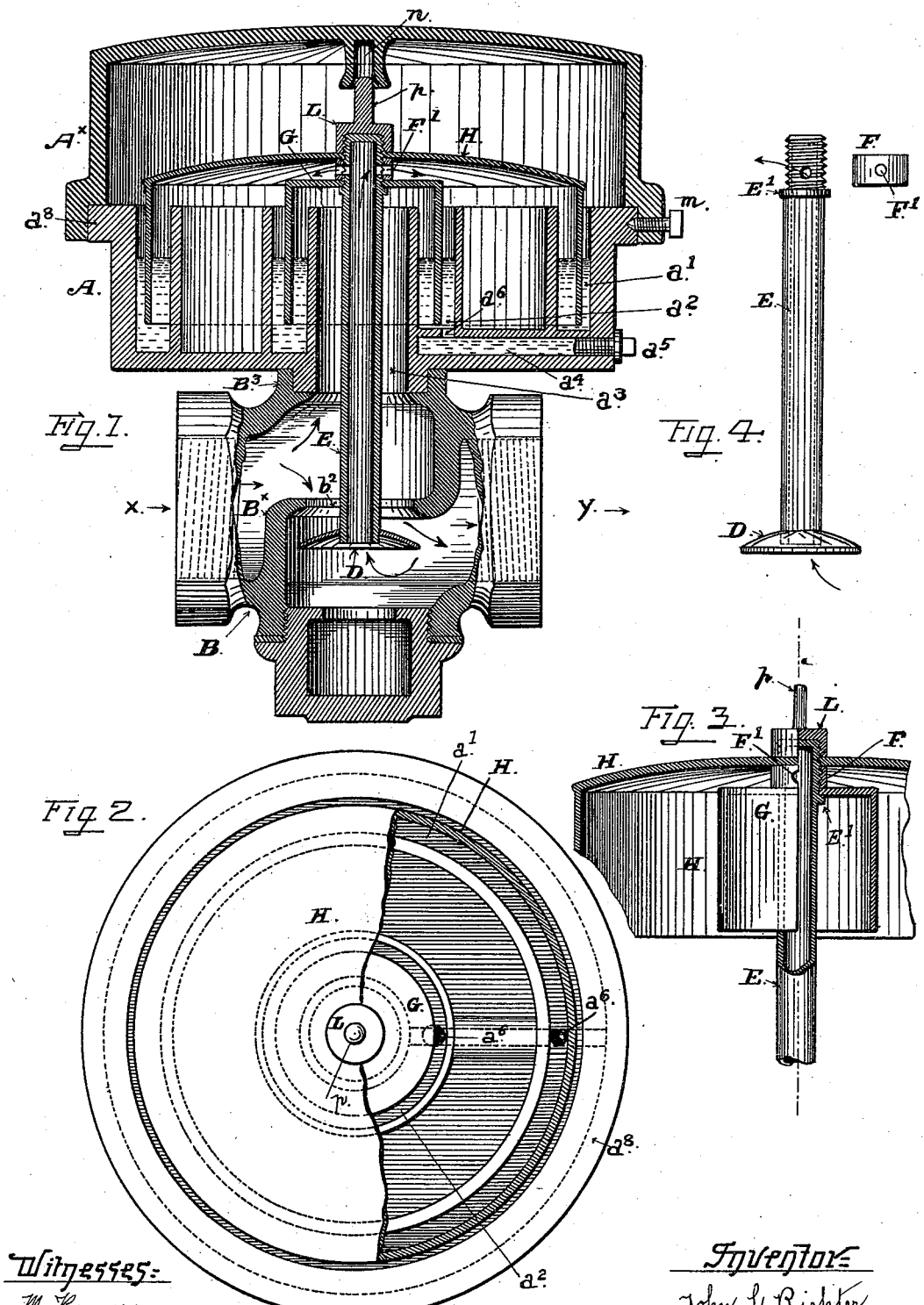
Witnesses:
M. Regner.
M. Levé.
Inventor:
John L. Richter
By Smith Osborn
his Attys.

UNITED STATES PATENT OFFICE.

JOHN L. RICHTER, OF ALAMEDA, CALIFORNIA.

GAS-REGULATOR.

SPECIFICATION forming part of Letters Patent No. 545,725, dated September 3, 1895.

Application filed February 20, 1894. Serial No. 500,918. (No model.)

*To all whom it may concern:*

Be it known that I, JOHN L. RICHTER, a citizen of the United States, residing at Alameda, county of Alameda, and State of California, have invented certain new and useful Improvements in Gas-Regulators, of which the following is a specification.

Devices or apparatus of the kind to which my present improvements relate are placed in the line of a service-pipe between a gas-meter and a gas-burner to regulate the flow of the gas under variations in the pressure, and are commonly known as "gas-regulators" and "gas-governors."

The improvements have for their object, mainly, to secure an even and steady flow of gas to the gas-burner under fluctuations or variations in the pressure of the gas as it leaves the meter or other first source of supply, and thereby to prevent wavering, flickering, and other unsteady action in the flame and waste of gas at the burner.

The improvements constituting my said invention and by which I attain the desired objects comprise certain novel construction and combination of parts, as hereinafter set forth.

The following description explains at length the nature of my said improvements and the manner in which I have constructed and applied the same for operation with satisfactory results, the accompanying drawings, forming part of this specification, being referred to by letters.

Figure 1 of the said drawings is an elevation in longitudinal section of a regulator constructed according to my invention and containing all the features of my said improvements. Fig. 2 is a plan or top view with the top of the float-chamber removed and the top of the outer and larger float broken away to expose the smaller float and other parts beneath. Fig. 3 is a detail view of the double float, principally in longitudinal section, showing a portion of the tubular valve-stem and the couplings that secure the float and the stem together. The inner or smaller member of the float and the upper end portion of the stem are shown in section on one side of the central line. Fig. 4 is a view of the valve and its stem removed from the valve-chamber.

A and $A^\times$ indicate two parts forming that part of the complete regulator to which I have given the name of "float-chamber."

B is the valve-body, on top of which the part A of the float-chamber is mounted. This last-mentioned part is a cylindrical basin formed with two concentric annular channels $a'$ $a^2$ and a central open way or passage $a^3$, extending vertically through the bottom upward to the level of the top or rim. The inner of the two annular channels sets around this central open way, while the outer one is of considerable increase in diameter and is situated just within the rim of the basin. These two channels are of equal depth, and each contains mercury or other liquid having suitable sealing qualities, into which the rim of the float is set. A passage $a^4$ in the bottom of the basin connects the two channels $a'$ $a^2$ together and also with a common outlet on the side of the basin. Each channel communicates with the before-mentioned passage through apertures $a^6$ in the bottom of the channel, and the outlet at the end of the passage is closed by a screw-plug $a^5$. This passage produces a common level of the mercury in the two channels and furnishes as well a common outlet for emptying the two channels of their contents in the operation of cleaning and adjusting the regulator.

The top of the basin A has a flanged rim $a^8$, and the rim of the top or part $A^\times$ is recessed to fit closely upon the rim aforesaid. As all the gas-holding spaces and passages in the float-chamber are located under the float, it will be seen that the joint between the basin A and the top $A^\times$ does not require to be gas-tight, and a gas-tight joint between these parts is not necessary. Ordinarily the two parts can be held in place together by one or two set-screws $m$; but a screw-joint may be used for that purpose.

The part B is similar in form to a globe-valve. The interior is divided into the inlet side $x$ and the outlet-side $y$ by the partition $B^\times$, in which is the circular aperture and seat $b^2$ for the valve.

In the top of the body is a circular opening with a standing rim $B^3$ to receive a neck or corresponding rim on the bottom of the float-chamber around the central open way and passage $a^3$, the two parts being closely fitted to produce a tight joint.

D is a valve of conical shape on top. It is fitted to a close seat against the under side of the aperture $b^2$ in the partition, so that it acts from below the partition in an upward direction, opening in the downward movement and closing in the upward movement.

E is the valve-stem, upon the lower end of which is fixed the valve, and on the upper end is secured the two members G H of the float. These two parts G H are rigidly secured on the stem in such manner that a space is left between the top or head of the smaller float and the under side of the head or top of the larger float, and the two members are maintained in such position and also at fixed or certain distance above the top face of the valve on the opposite end of the stem.

The means which I have employed with good results to secure the stem and float together in the manner before mentioned consists of a screw-thread formed on the upper end of the stem D above a flange or collar E' on the stem, a sleeve or tubular piece F, threaded internally to fit the threaded portion of the stem and a threaded cap L, also fitted to the end of the stem. The two parts G H have openings in the center to admit the end of the stem and are set upon the threaded portion of the stem, as shown in Figs. 1 and 3, with the piece F interposed between them. The piece F is screwed down against the head of the member G, and the cap L is screwed down on the outer end of the stem to clamp the member H. The smaller float is held tightly between the collar E' on the stem and the tubular piece F, while the larger float H is clamped tightly between the piece F and the cap L.

The confined space beneath the large float is connected with the outlet side or the space in the valve-chamber back of the valve by a tubular passage which, for convenience and simplicity of construction, is made through the valve-stem, as shown in Figs. 1, 3, and 4. For this purpose the valve-stem is made of a tubular rod with the open lower end underneath or beyond the valve and one or more openings in the side of the stem at the top below the closed upper end and just under the head of the float H. These apertures F' are made in the threaded piece F and also in the stem that it covers, and consequently the outlet end of the passage connecting the space under the float with the valve-chamber is situated between the two float-members G H. Thus the confined space beneath the larger float is under the same pressure as the outlet side of the valve from which the gas flows to the burners, and the variations in the working or regulated pressure, such as are due to variations in the consumption of gas at the burners, act on or affect the float to change the position of the valve with respect to its seat. Sudden changes or fluctuations in the pressure of the gas at the inlet side of the valve-chamber, due to irregular working of the meter and other causes, and producing unsteady flame and other imperfect conditions at the burner, do not affect the valve, however, as they are checked and effectually counteracted by the smaller float, because, that part being fixed rigidly to the stem of the valve, the pressure of the gas from the inlet side is exerted not only against the top of the valve, but through the open way $a^3$, is received also in the opposite direction against the head G of the float, thereby balancing the valve and preventing vibrations. Under variations in the consumption of gas from the outlet side of the valve-chamber the area of the passage through the valve-seat is regulated by the perpendicular movements of the valve produced by the float H, which is constantly under pressure of the gas from the outlet side, and the valve itself, being balanced at all times by the smaller float, it will respond to the slightest fluctuations or variations in the consumption of the gas from the outlet side of the valve-chamber, so that the float H is sensitive to small changes in pressure, and its action upon the valve is made quite delicate. The float can be adjusted to greater or less degrees of sensitiveness under slight increase or variations in pressure by adding or by removing small weights on the top of the larger head or float. This mode of adjustment, however, is commonly resorted to in gas-regulators.

The office of the socket $n$ on the under side of the top A' and the point or finger $p$ on the top of the screw-cap I (shown in Fig. 1) is to guide the upper end of the valve-stem and keep the valve always in the center of the valve-seat. This is the only guide employed in the device, and there are no guides for the valve-stem within the chamber itself, and the ways and passages are left free and without obstructions. Springs and other mechanical devices to balance the valve are dispensed with.

Having thus described my invention, what I claim as new, and desire to secure by Letters Patent, is—

1. In a gas-regulator a disk valve controlling the connecting passage between the inlet-side and the outlet side of the valve-chamber and acting against the pressure from the inlet-side to close the passage, and a float-chamber having a float composed of two inverted cylinders with closed heads of different diameters arranged concentrically and connected with the disk-valve by a tubular rigid stem, a passage connecting the inlet-side of the valve-chamber above the valve with the confined space under the smaller cylinder of the float, and the passage through the stem connecting the confined space under the larger cylinder of the float with the outlet-side of the valve-chamber, at a point between the heads of the two cylinders combined, for operation as set forth.

2. In a gas-regulator, the combination with a valve-chamber having a gas-passage, a valve closing said passage, a float-chamber having two concentric sealing troughs, a float composed of two inverted cups having heads of different diameters, arranged concentrically, and setting into the sealing troughs, and a passage connecting the inlet side of the valve chamber with the space within the float-basin beneath the smaller head; of a tubular valve-stem opening at its lower end at the outlet side of the valve, exteriorly threaded at its upper end, and provided with a lateral aperture through said threads, the heads of the cup-shaped floats being mounted on said threads respectively above and below the aperture therein, as and for the purpose set forth.

3. In a gas-regulator, the combination with a valve-chamber having a gas-passage, a valve closing said passage, a float-chamber having two concentric sealing-troughs, a float composed of two inverted cups arranged concentrically with their edges setting into said troughs, and a passage leading from above the valve to the space beneath the smaller cup; of a tubular valve-stem opening at its lower end beneath the valve, exteriorly threaded at its upper end, and provided with a lateral aperture through said threads, the heads of the cups being mounted on the threads respectively above and beneath the aperture therein, a tubular piece screwed on the threads between said heads and provided with an aperture registering with that in the threads, a collar on the stem below the lower cup, and a nut screwed on to the threads above the upper cup, as and for the purpose set forth.

In testimony that I claim the foregoing, I have hereunto set my hand and seal.

JOHN L. RICHTER. [L. S.]

Witnesses:
EDWARD E. OSBORN,
JAMES L. KING.